March 25, 1958     H. C. CHRISTIANCE     2,827,744
ROAD DRAG
Filed March 6, 1956
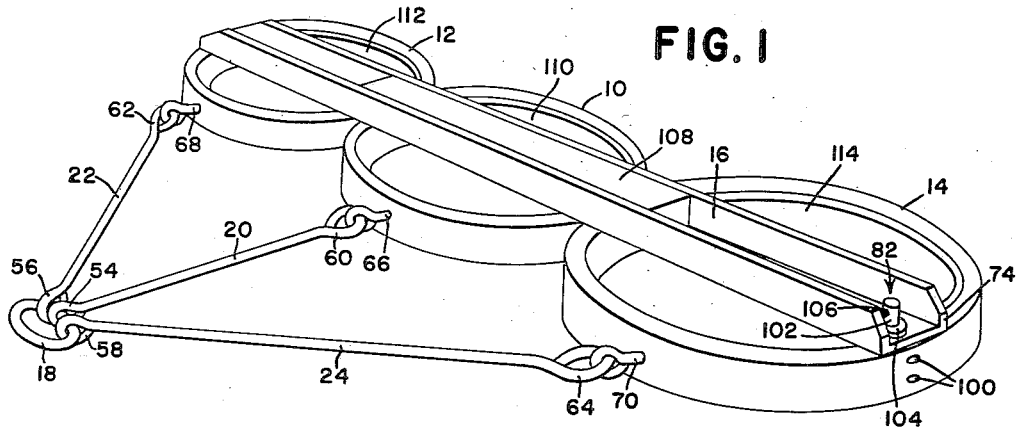
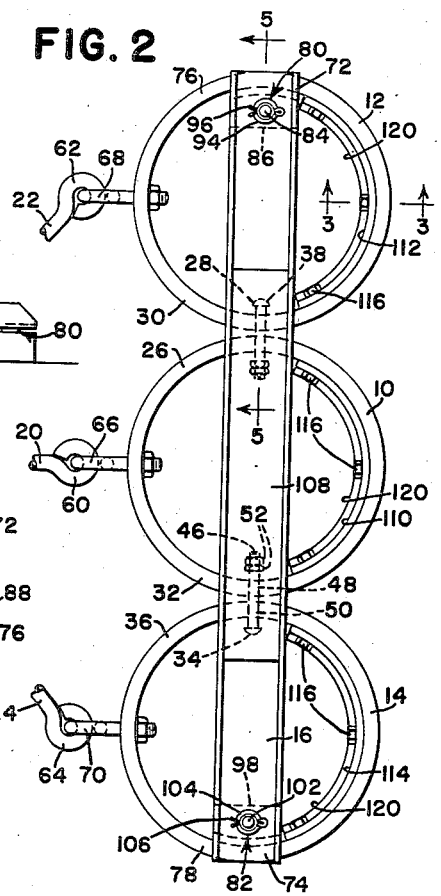
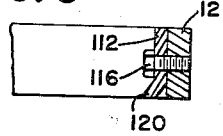
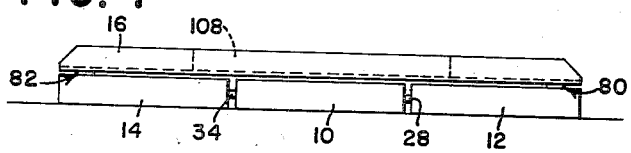
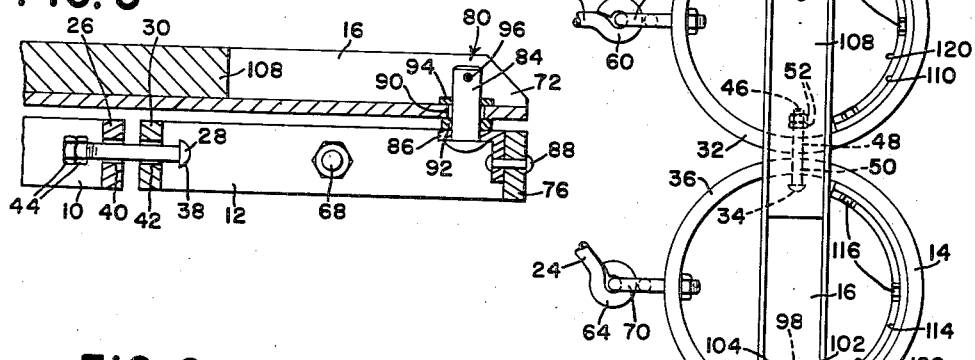
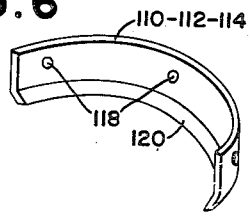
INVENTOR.
H. C. CHRISTIANCE
BY
ATTORNEY

United States Patent Office 2,827,744
Patented Mar. 25, 1958

2,827,744

ROAD DRAG

Harry C. Christiance, West Brooklyn, Ill.

Application March 6, 1956, Serial No. 569,899

1 Claim. (Cl. 55—22)

This invention relates to a drag for leveling and contouring the ground, roads or other terrain and has for its principal object the provision of a novel drag of simplified construction in which the drag members are in the form of rings articulately interconnected and stabilized to accommodate variations in ground contour.

It is known of course to utilize rings as drag members but prior constructions have failed to exploit the design to the fullest, primarily because of faulty interconnection and lack of stabilization of the drag rings. According to the present invention, this defect is cured in a preferred embodiment, by the provision of a center ring flanked by a pair of outer rings, the center ring being diametrically connected respectively to the outer rings so as to achieve control of the relative rise and fall of the rings. The stabilizer features additional control, particularly when it is connected to only outer portions of the outer rings and in vertically spaced relation to the center ring. The invention has for another object the provision of novel scraper blades of arcuate design removably secured respectively to the drag rings. The invention also features a simple hitch having articulate connection individually to the rings and in common to a draft or hitch member that facilitates easy connection of the drag to a draft source such as a tractor.

The foregoing and other important objects and desirable features inherent in and encompassed by the invention will become apparent as a preferred embodiment of the invention is disclosed in detail in the ensuing specification and accompanying sheet of drawings, the several figures of which will be described immediately below.

Figure 1 is a perspective of the improved drag.

Figure 2 is a plan of the drag, omitting the major portion of the hitch in the interests of conserving space on the sheet.

Figure 3 is an enlarged fragmentary section on the line 3—3 of Figure 2.

Figure 4 is a rear elevation of the drag, on a reduced scale.

Figure 5 is an enlarged fragmentary section on the line 5—5 of Figure 2.

Figure 6 is a perspective of one of the scraper blades.

In its simplest and most preferable form, the drag comprises a center drag ring 10, a pair of outer drag rings 12 and 14, a stabilizer element 16 and hitch means including a forwardly disposed hitch member or clevis ring 18 and a plurality, here three, of hitch bars 20, 22 and 24, by means of which the assembled drag may be drawn over the ground, roads or other terrain desired to be leveled or otherwise contoured. The arrangement of the drag rings is such that the center ring 10 is flanked at its opposite sides by the outer rings 12 and 14, the three rings each having a transverse diameter lying on a common line transverse to the line of advance.

The center ring has at one outer portion 26 thereof a transverse pivot 28 connected to a proximate inner portion 30 of the outer ring 12 and further has at its transversely or diametrically opposite portion 32 a second pivot 34 connected to the proximate inner portion 36 of the other outer ring 14. The purpose of the pivots 28 and 34 is to interconnect the three rings for advance together while permitting relative movement thereof to accommodate variations in ground contour. In short, the pivotal connections are articulate on a transverse axis and to this end the pivot 28 is made up of a pin 38 passed loosely through apertures 40 and 42 respectively in the ring portions 26 and 30; and the pin carries lock nuts 44 thereon, preferably spaced from the ring portion 30 so as to achieve the necessary articulation (Fig. 5). The other pivot 34 comprises similar components; namely, a pivot pin 46, passing through ring portion apertures 48 and 50, and carrying lock nuts 52.

The hitch bars 20, 22 and 24 respectively have front eyes 54, 56 and 58, articulately connected to the clevis or hitch ring 18; and these bars further have rear eyes 60, 62 and 64 connected individually to the rings 10, 12 and 14, respectively, by eye members 66, 68 and 70, the arrangement accommodating the relative articulation of the drag rings as ground or road contour varies.

The stabilizer element 16 has opposite ends 72 and 74 that are respectively proximate to outer portions 76 and 78 of the outer rings 12 and 14, and these ends and ring portions are articulately interconnected by a pair of element-connecting means 80 and 82. The means 80 (Fig. 5) includes an upright pivot pin 84 passed through and rising from an angle bracket 86 rigidly secured at 88 to the outer ring portion 76, the proximate element end 72 having an aperture 90 therethrough which loosely receives the pin 84. A spacer 92 is interposed between the top surface of the bracket 86 to space the element slightly above the top edge of the ring. A similar spacer (not shown) included in the other element-connecting means 82 is similarly arranged and similarly functions at the opposite side of the drag. A washer 94 above the element and a retaining means in the form of a cotter 96 completes the means 80, it being understood that the other means 82 is similarly constituted. Some of these components are visible in the drawings, such as the other bracket 98 (Fig. 2), other bracket securing means 100 (Fig. 1) and other pivot pin 102, washer 104 and cotter 106 (Figs. 1 and 2). The arrangement is such that the element 16 cross-connects the two outer rings and is vertically clear of the center ring 10 in the preferred construction shown. Because the connections 80 and 82 are articulate, rise and fall of the rings relative to each other is controlled, since upward movement of an outer ring, for example, lifts the element at one end and depresses it at the other; and, although the lifted ring may pivot about the transverse axis of its respective pivot, 28 or 34, such pivoting is limited by the articulate connections 80 and 82 against excess fore-and-aft tilting. The element has provision for carrying a weight as at 108 and to this end is in the form of an upwardly opening channel, it being understood that the number and size of weights can be varied according to conditions.

Another feature of the invention is that the drag rings 10, 12 and 14 respectively carry scraper blades 110, 112 and 114. Each blade is substantially semi-circular and is arranged concentrically within the rear half of its drag ring, being removably secured in place as by machine screws 116. One of the blades is shown by itself in Fig. 6, wherein it will be seen that the blade is apertured at 118 for receipt of the screws 116, and wherein it will be further seen that the blade has a forwardly sloped scraping edge 120. Since the blades are removable, they may be taken off for sharpening and of course may be replaced.

Among the advantages of the novel drag disclosed and claimed herein is the ability of same to move earth without leaving objectionable ridges parallel to the line of advance, as is common with conventional angled blade scrapers. Nor will the inventive drag chatter over and accentuate transverse ridges, thus avoiding the well-known "washboard" effect in roads. Other advantages will readily occur to those versed in the art, as will many modifications and alterations in the preferred form of the invention disclosed, all of which may be achieved without departure from the spirit and scope of the invention.

What is claimed is:

A drag adapted to be drawn over the ground, comprising: a center drag ring and a pair of outer drag rings arranged with the center ring flanked at each side by an outer ring so that each ring has its transverse diameter lying substantially on a common line transverse to the line of advance; a first pivot interconnecting an outer portion of the center ring to an inner portion of one outer ring substantially on said transverse line and a second pivot connecting a diametrically opposite outer portion of the center ring to an inner portion of the other outer ring substantially on said line, said pivots being coaxial on said line and enabling vertical pivotal movement of said rings relative to each other about said transverse line to accommodate variations in ground contour; a hitch member disposed ahead of and generally in fore-and-aft alinement with the center ring; three individual hitch bars articulately connected to said hitch member and extending rearwardly therefrom and articulately connected individually and directly to the center and outer rings; a transverse stabilizer element in the form of an upwardly facing channel disposed above the rings and substantially directly above said transverse line on which the pivots are coaxial, said element having opposite outer ends respectively proximate to the outer portions of the outer rings, said channel element adapted to carry weight means recessed therein; and a pair of element-connecting means, one at each end of said element and articulately connecting said end to the outer portion of the associated outer ring, each element-connecting means including an inwardly-directed bracket on the respective ring outer portion and beneath the proximate end of the channel element and a vertical pin passed through said bracket and promixate end of the channel element and recessed in the latter and a spacer interposed between the bracket and the underside of the channel element end portion.

References Cited in the file of this patent

UNITED STATES PATENTS

| | | |
|---|---|---|
| 359,988 | Woods | Mar. 22, 1887 |
| 851,126 | Forshey | Apr. 23, 1907 |
| 869,065 | Datson | Oct. 22, 1907 |
| 909,966 | Traver | Jan. 19, 1909 |
| 2,101,187 | Olson et al. | Dec. 7, 1937 |
| 2,552,736 | Rayner | May 15, 1951 |
| 2,587,494 | Love | Feb. 26, 1952 |